(12) United States Patent
Abbassi et al.

(10) Patent No.: US 11,692,561 B2
(45) Date of Patent: Jul. 4, 2023

(54) SELF-COOLING SYSTEM FOR AN ENCLOSED HOUSING

(71) Applicant: CNH Industrial America LLC, New Holland, PA (US)

(72) Inventors: Hesam Abbassi, Birmingham, MI (US); Panos Tamamidis, Northbrook, IL (US); Samrendra Singh, Bolingbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 978 days.

(21) Appl. No.: 16/210,604

(22) Filed: Dec. 5, 2018

(65) Prior Publication Data

US 2020/0182260 A1 Jun. 11, 2020

(51) Int. Cl.
  *F16H 57/04* (2010.01)
  *F16H 57/031* (2012.01)
  *F04D 29/58* (2006.01)
  *F16H 9/12* (2006.01)

(52) U.S. Cl.
  CPC ......... *F04D 29/584* (2013.01); *F16H 57/048* (2013.01); *F16H 9/12* (2013.01); *F16H 57/031* (2013.01); *F16H 57/0416* (2013.01)

(58) Field of Classification Search
  CPC .. F16H 57/0416; F16H 57/048; F16H 57/031; F16F 15/1442; F16F 15/1204; F16F 15/1464
  See application file for complete search history.

(56) References Cited

U.S. PATENT DOCUMENTS

| | | | | |
|---|---|---|---|---|
| 2,290,542 A | * | 7/1942 | Criley | F16D 13/72 192/113.23 |
| 2,583,751 A | * | 1/1952 | Schmitter | F16H 57/0493 184/104.1 |
| 3,002,597 A | * | 10/1961 | Warman, Jr. | F16D 21/06 192/48.609 |
| 3,678,708 A | | 7/1972 | Ernst et al. | |
| 3,768,276 A | | 10/1973 | Caldwell et al. | |
| 5,366,411 A | * | 11/1994 | Harpin | F16D 3/76 464/17 |
| 6,234,903 B1 | | 5/2001 | Walter et al. | |
| 7,091,635 B1 | * | 8/2006 | Gilliland | H02K 7/02 310/63 |
| 8,333,574 B2 | | 12/2012 | Rowe, Jr. | |
| 8,758,146 B2 | | 6/2014 | Rower, Jr. | |
| 9,366,331 B2 | | 6/2016 | Eberhardt | |

* cited by examiner

*Primary Examiner* — Daniel D Yabut
(74) *Attorney, Agent, or Firm* — Peter Zacharias

(57) ABSTRACT

A self-cooling system includes at least one rotating component and a housing configured to enclose the at least one rotating component. The housing includes at least one inlet bore and at least one exhaust bore. The at least one exhaust bore is disposed radially outward from a radial position of the at least one inlet bore with respect to an axis of rotation of the at least one rotating. The at least one inlet bore and the at least one exhaust bore are positioned to establish a pressure differential configured to circulate a fluid into the at least one inlet bore, through the housing, and out the at least one exhaust bore. The system does not have any feature in addition to the at least one rotating component configured to drive the fluid into the at least one inlet bore, through the housing, and out the at least one exhaust bore.

19 Claims, 5 Drawing Sheets

SELF-COOLING SYSTEM FOR AN ENCLOSED HOUSING

BACKGROUND

The invention relates generally to a self-cooling system for an enclosed housing.

Certain housings (e.g., transmission housing) enclose components that generate heat during use. The housing may be enclosed such that heat generated in the housing changes the temperature of the components to increase above a desired threshold temperature. Certain housings enclose additional cooling features (e.g., fans, blades, etc.) that expel heat from the housing. Other housings enclose modified components (e.g., fixtures attached to the components, grooves in the components, etc.) that expel heat from the housing. Unfortunately, these cooling features require modification to the components in the housing or installation of additional components in the housing, thereby increasing the cost and/or complexity of the system.

BRIEF DESCRIPTION

In certain embodiments, a self-cooling system includes at least one rotating component and a housing enclosing at least one rotating component. The housing includes at least one inlet bore and at least one exhaust bore. The at least one exhaust bore is disposed radially outward from a radial position of the at least one inlet bore with respect to an axis of rotation of the at least one rotating component. The at least one inlet bore and the at least one exhaust bore are positioned to establish a pressure differential configured to circulate a fluid into the at least one inlet bore, through the housing, and out of the at least one exhaust bore. The self-cooling system does not have any feature in addition to the at least one rotating component configured to drive the fluid into the at least one inlet bore, through the housing, and out of the at least one exhaust bore.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
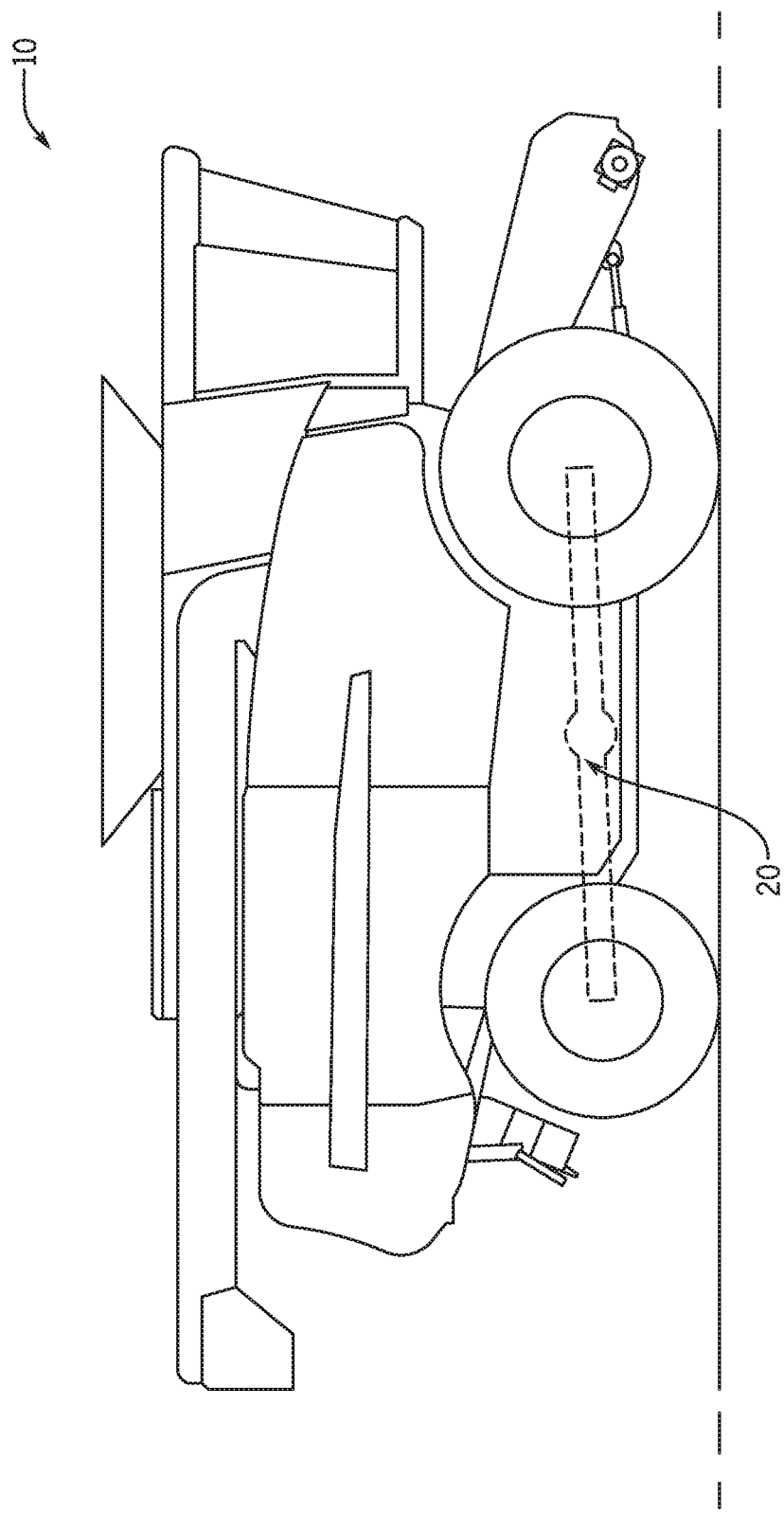
FIG. 1 is a side view of an embodiment of a work vehicle.

Turning to the drawings, FIG. 1 is a side view of an embodiment of a work vehicle 10. The work vehicle 10 may be configured to facilitate agricultural operations. For example, the work vehicle 10 may be a harvester configured to support a harvesting apparatus to facilitate harvesting crops. The work vehicle 10 includes a drive line 20. The drive line 20 may be configured to rotate to drive movement of the work vehicle 10. A housing may be disposed in the drive line. During operation of the work vehicle 10, rotating components in the housing may generate heat. A self-cooling system may be disposed in the housing to decrease or stabilize the temperature in the housing.

Figure 2:
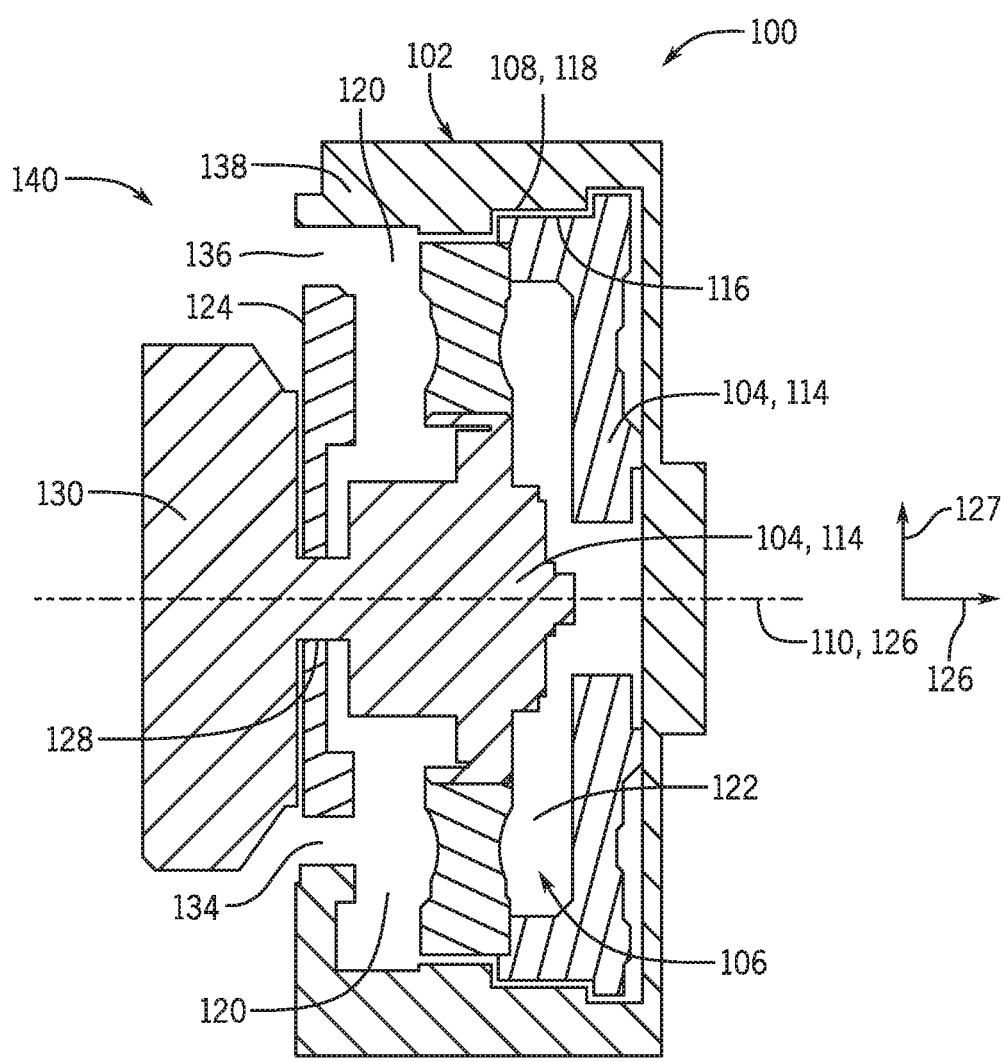
FIG. 2 is a cross-sectional view of an embodiment of a self-cooling system.

FIG. 2 is a cross-sectional view of an embodiment of a self-cooling system 100. The self-cooling system 100 includes a housing 102 configured to enclose at least one component 104. In some embodiments, the at least one component 104 may generate heat during use. The housing 102 may be substantially enclosed such that, without self-cooling during use, heat generated in the housing 102 may continually increase the temperature of the components within the housing 102. Self-cooling in the housing 102 may decrease or stabilize the temperature within the housing 102, which may increase a life-span of the at least one component 104 enclosed within the housing 102 by substantially reducing or eliminating exposure to a temperature above a desired threshold temperature.

The housing 102 has an interior 106 configured enclose the at least one component 104. Accordingly, the interior 106 of the housing may be hollow. In certain embodiments, the interior 106 has a substantially cylindrical shape. In other embodiments, the interior may have a spherical shape, polygonal shape, or another suitable shape for housing 102 the at least one component 104. The housing 102 has a non-uniform interior surface 108. However, in some embodiments, the housing 102 may have a uniform interior surface with at least one interface feature configured to interface with the at least one component 104. The at least one interface feature may be configured to support the at least one component 104 in the housing 102.

In some embodiments, the housing 102 is configured to enclose at least one other rotating component 114. The at least one other rotating component 114 rotates with respect to the housing 102. The rotating component has a substantially cylindrical shape. Moreover, the rotating component is aligned coaxial to a longitudinal axis 126 of the housing 102. A radially exterior surface 116 of the rotating component is disposed proximate an interior side wall 118 of the housing. However, the radially exterior surface 116 may not be configured to contact the interior side wall 118 of the housing. The proximity of the at least one rotating component 114 to the side wall 118 may cause the at least one rotating component 114 to act as a physical and/or thermal barrier between a first chamber 120 of the housing 102 and a second chamber 122 of the housing 102.

The housing 102 includes at least one component bore 128 that passes through an axial end 124 of the housing 102. The at least one component bore 128 may be disposed along a longitudinal axis 126 of the housing 102. A portion of the at least one rotating component 114 is positioned in the at least one component bore 128. In some embodiments, a driving feature 130 is configured to attach an exterior driving mechanism (e.g., gas engine, motor, etc.) to the at least one rotating component 114, via the portion of the at least one rotating component 114 extending through the at least one component bore 128. The exterior driving mechanism may be configured to drive rotation of the at least one rotating component 114. For example, the driving mechanism may be an engine or motor configured to drive rotation of the driving feature 130.

Additionally, the housing 102 has at least one inlet bore 134 and at least one exhaust bore 136. The at least one inlet bore 134 and the at least one exhaust bore 136 are disposed in the axial end 124 of the housing 102 with respect to an axis of rotation 110 of the at least one rotating component 114. The axis of rotation 110 may be coaxial with the longitudinal axis 126. However, in some embodiments, the at least one exhaust bore 136 may pass through a radial portion 138 of the housing 102. The at least one inlet bore 134 and the at least one exhaust bore 136 may each extend from an exterior 140 (e.g., environment) to an interior 106 of the housing 102, such that a fluid (e.g., air) may pass through the at least one inlet bore 134 and the at least one exhaust bore 136.

A longitudinal axis of the at least one inlet bore 134 and a longitudinal axis of the at least one exhaust bore 136 may each be disposed parallel to the longitudinal axis 126 of the housing 102. The at least one inlet bore 134 and the at least one exhaust bore 136 may have a uniform diameter through the housing 102. In another embodiment, the at least one inlet bore 134 and the at least one exhaust bore 136 may have non-uniform diameters configured to control fluid flow through the at least one inlet bore 134 and the at least one exhaust bore 136. In some embodiments, the at least one inlet bore 134 and the at least one exhaust bore 136 have selected profiles. For example, the at least one inlet bore 134 and/or the at least one exhaust bore 136 may form at least one turn along a profile of the at least one inlet bore 134 and/or the at least one exhaust bore 136 through the housing 102.

The at least one exhaust bore 136 is disposed radially outward from the at least one inlet bore 134. Generally, the at least one inlet bore 134 and the at least one exhaust bore 136 are positioned to establish a pressure differential configured to circulate a fluid (e.g., air) into the at least one inlet bore 134, through the housing 102, and out the at least one exhaust bore 136 to cool an interior 106 of the housing 102. Positioning the at least one exhaust bore 136 radially outward from the at least one inlet bore 134 may establish the pressure differential.

The at least one rotating component 114 is configured to rotate within the interior 106 of the housing 102. A linear velocity of a surface (e.g., axial surface) of the at least one rotating component 114 increases radially outward from the axis of rotation 110 of the at least one rotating component. For example, a linear velocity of a portion of the rotating component proximate the axis of rotation 110 is less than a linear velocity of a portion of the rotating component proximate a side wall 118 of the housing 102. Rotating the at least one rotating component 114 may drive the fluid (e.g., air) inside the interior 106 of the housing 102 outwardly along the radial axis 127. In addition, a velocity of the fluid in the housing 102 may increase moving radially outward from the axis of rotation 110. Accordingly, the fluid proximate the exhaust bore may have a greater linear velocity than the fluid proximate the inlet bore. The difference in linear velocity of the fluid between the at least one inlet bore 134 and the at least one exhaust bore 136 creates a pressure differential. The pressure differential may drive fluid flow into the at least one inlet bore 134, through the housing 102, and out the at least one exhaust bore 136, which may replace heated fluid disposed within the housing 102 with a fluid from the exterior 140. The fluid from the exterior 140 may have a lower temperature than the fluid disposed within the housing 102. Thus, circulating fluid from the exterior 140 into the housing 102 may reduce the temperature of components inside of the housing 102.

In some embodiments, the at least one rotating component 114 has a primary function apart from a secondary function of driving the fluid in the housing 102. For example, the rotating component may be a flywheel configured to store mechanical energy in the form of momentum to normalize power output from an engine to a transmission. Driving fluid in the housing 102 may be a result of the flywheel performing its primary function (e.g., storing mechanical energy in the form of momentum). Further, the self-cooling system 100 does not include any additional feature configured to drive fluid flow through the housing 102. For example, the self-cooling system 100 does not include a dedicated fan or rotational component designed to drive fluid flow through the housing 102. Further, the self-cooling system 100 does not include modifications (e.g., grooves, indents, attachments) to the rotating component to drive fluid flow 248 in the housing 102.

Figure 3:
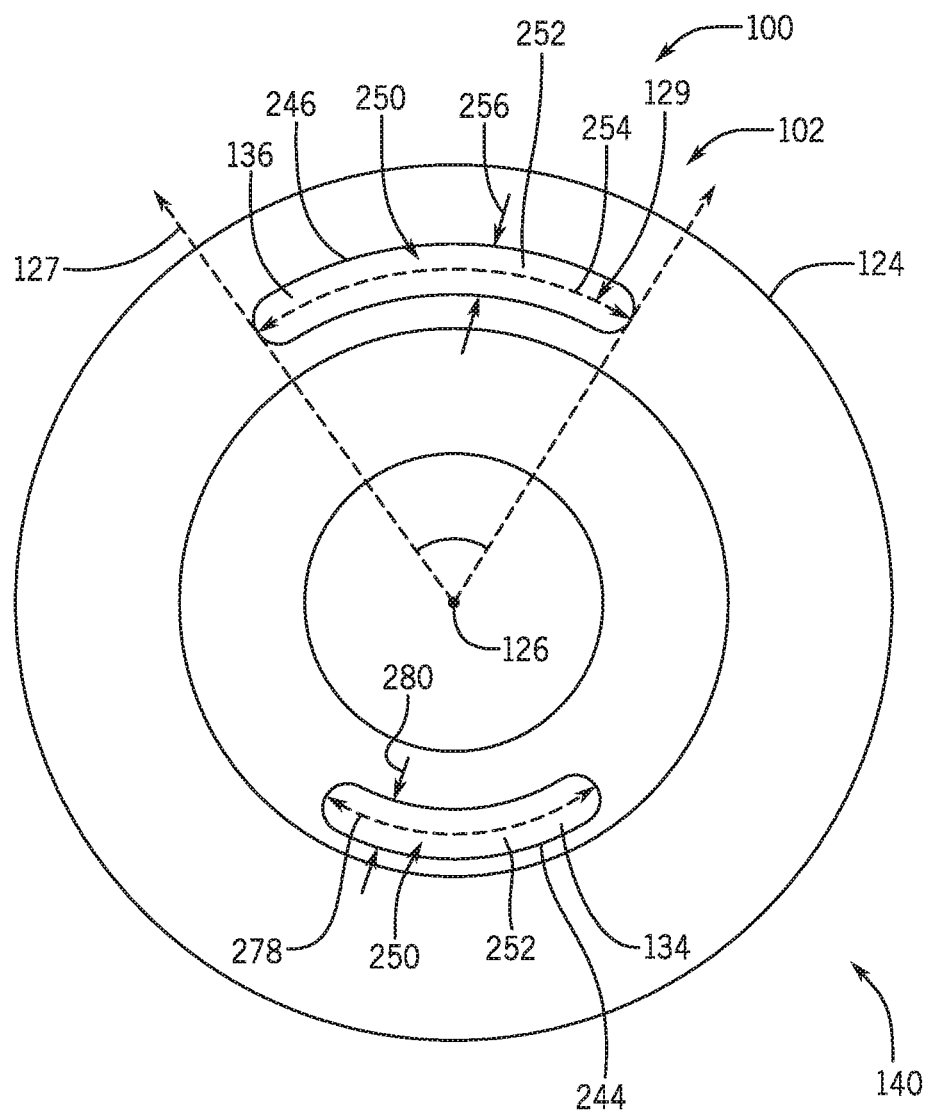
FIG. 3 is a side view of an embodiment of an axial end of the housing of the self-cooling system of FIG. 2.

FIG. 3 is a side view of an embodiment of the axial end of the housing 102 of the self-cooling system 100 of FIG. 2. As discussed above, the at least one exhaust bore 136 is disposed radially outward along the radial axis 127 from the at least one inlet bore 134 with respect to longitudinal axis 126, such that fluid flows into the at least one inlet bore 134, through the housing 102, and out the at least one exhaust bore 136 to replace heated fluid disposed within the housing 102 with a fluid from the exterior 140. The at least one inlet bore 134 and the at least one exhaust bore 136 are configured to facilitate flow through the interior of the housing 102.

The at least one inlet bore 134 and the at least one exhaust bore 136 may each have geometries configured to facilitate fluid flow through the housing 102. In the illustrated embodiment, the at least one inlet bore 134 and the at least one exhaust bore 136 have arcuate geometries. The arcuate geometries may each have an arc shaped axial profile 252. In some embodiments, each of the arc shaped axial profiles 252 may extend along a respective circumferential axis 129, such that the degree of curvature of the arc shape axial profiles is substantially similar to a degree of curvature along a circumference of the axial end of the housing 124.

In some embodiments, the arc shaped axial profiles 252 of the inlet bore and the exhaust bore each extend 15 degrees to 95 degrees along the circumferential axis 129. In some embodiments, the arc shaped axial profiles 252 each extend along an equal angle along the circumferential axis 129. For example, the arc shaped axial profile of the inlet bore may extend 60 degrees along the circumferential axis 129. Additionally, the arc shaped axial profile of the exhaust bore may also extend 60 degrees along the circumferential axis 129. Because the exhaust bore is positioned outwardly from the inlet bore along the radial axis, the arc shaped axial profile of the exhaust bore may have a greater arc length than the axial profile of the inlet bore along the circumferential axis 129. In some embodiments, the arc shaped axial profile of the inlet bore may extend plus or minus five degrees along the circumferential axis 129 in comparison to the angle that the arc shaped axial profile of the exhaust bore extends along the circumferential axis 129. In another embodiment, the arc shaped axial profile may extend up to plus or minus fifteen degrees along the circumferential axis 129. In other embodiments, the arc shaped profile of the inlet bore may extend up to plus or minus five degrees along the circumferential axis 129 (e.g., +/−0.01, 0.1, 2, 3, 4, 5, etc. degrees).

Moreover, in other embodiments, the arc shaped geometries of the at least one inlet bore 134 and the at least one exhaust bore 136 may have other profiles configured to facilitate flow through the housing 102. The other profiles may include arc shaped axial profiles 252 with varying radii of curvature. In some embodiments, the arc shaped axial profiles 252 are not oriented with respect to the axis of rotation 110. In certain embodiments, the arc shaped axial profile of the inlet bore has an arc length 278 of 120 to 180 millimeters and an arc width 280 of 16 to 28 millimeters. Further, the arc shaped axial profile of the exhaust bore has an arc length 254 of 180 to 240 millimeters and an arc width 256 of 19 to 31 millimeters. In some embodiments, the arc length 254 and arc width 256 of the arc shaped geometry of the at least one exhaust bore 136 is are larger than the arc length 278 and arc width 280 of the arc shaped geometry of the at least one inlet bore 134. In some embodiments, the area of the at least one exhaust bore 136 is larger than the area of the at least one inlet bore 134.

Figure 4:
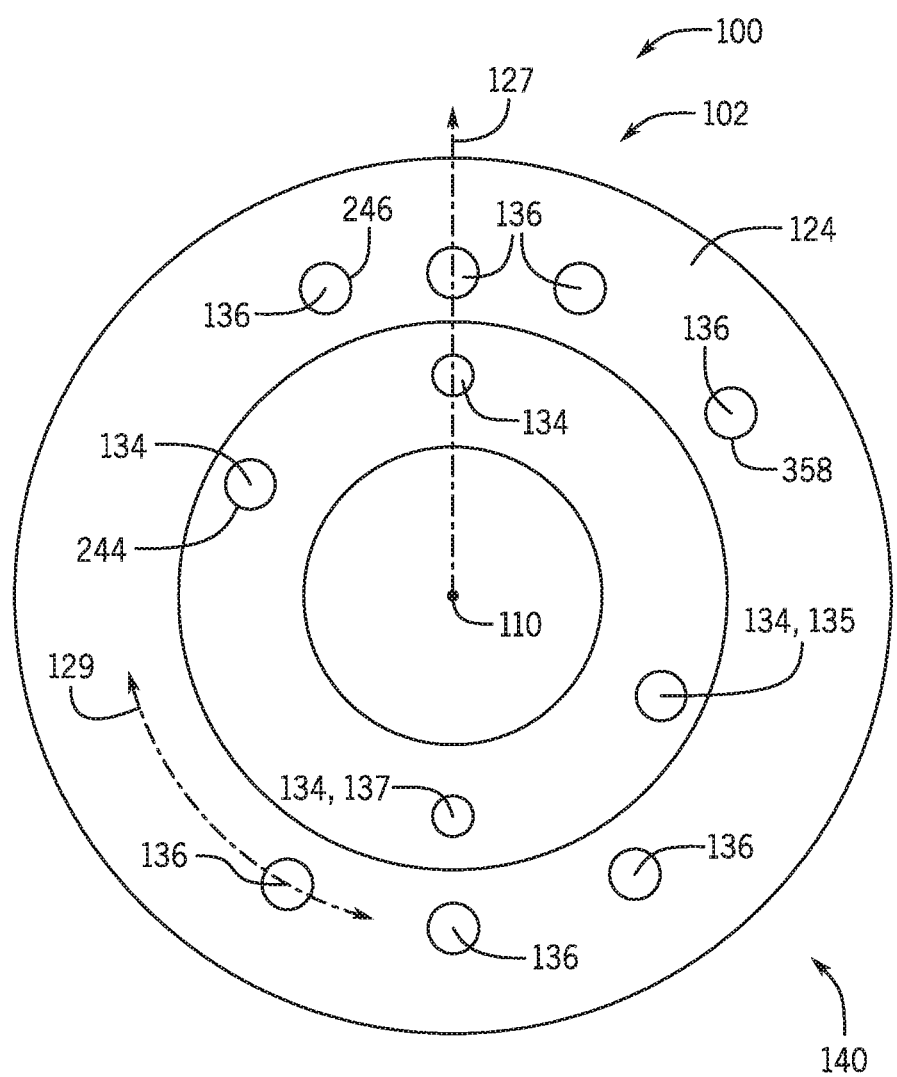
FIG. 4 is a side view of another embodiment of the axial end of the housing of the self-cooling system of FIG. 2.

FIG. 4 is a side view of another embodiment of the housing of the self-cooling system of FIG. 1. As discussed above, the positioning, orientation, and size of least one exhaust bore and the at least one inlet bore 134 are configured to facilitate fluid flow through the interior of the housing 102. Further, the at least one exhaust bore and the at least one inlet bore may have different shapes. For example, the at least one exhaust bore 136 may have a circular shape, whereas the at least one inlet bore 134 may have a rectangular shape, elliptical shape, or another shape.

In the illustrated embodiment, the housing has multiple inlet bores and multiple outlet bores. Each inlet bore 134 of the multiple inlet bores and each exhaust bore 136 of the multiple exhaust bores have circular shaped axial profiles 358. The circular shaped axial profile of each exhaust bore 246 may have a greater diameter than the circular shaped axial profile of each inlet bore 244. In some embodiments, each of the multiple inlet bores 134 and each of the multiple exhaust bores 136 are disposed on opposing sides of the housing with respect to an axis of rotation 110. For example, a first inlet bore 134 may be disposed at zero degrees with respect to the axis of rotation 110, and a first exhaust bore 136 may be disposed at 180 degrees with respect to the axis of rotation 110. However, in some embodiments the first exhaust bore 136 may be disposed at 165 degrees to 195 degrees with respect to the axis of rotation 110. In other embodiments, the first exhaust bore may be disposed at ninety degrees to 270 degrees.

In the illustrated embodiment, the housing 102 has multiple inlets bores 134 and multiple exhaust bores 136. The exhaust bores 136 may be disposed radially outward from the inlet bores 134 with respect to the radial axis 127. In certain embodiments, each inlet bore is disposed at a first radius along the radial axis 127 with respect to the axis of rotation 110, and each exhaust bore is disposed at a second radius along the radial axis 127 with respect to the axis of rotation 110. The second radius is disposed radially outward from the first radius along the radial axis. In some embodiments, at least one exhaust bore is disposed at a third radius along the radial axis. The third radius may be disposed radially outward from the first radius along the radial axis 127. In some embodiments, each exhaust bore may be disposed at a different radius along the radial axis that is disposed radially outward from the first radius. In some embodiments, each inlet bore may be disposed at a different radius. Each radius corresponding to an exhaust bore may be disposed radially outward from radii corresponding to inlet bores.

Further, in some embodiments, each exhaust bore and each inlet bore has a circular shaped axial profile. Each exhaust bore may have a substantially similar diameter, and each inlet bore may have a substantially similar diameter. For example, each exhaust bore and each inlet bore may have a 0.5 inch diameter. In some embodiments, each exhaust bore may have a 0.75 inch diameter, whereas each inlet bore may have a 0.6 inch diameter. In some embodiments, the plurality of exhaust bores 136 and the plurality of inlet bores 134 have non-uniform diameters such that the diameters of at least two bores may be different (e.g., a first inlet bore 135 has a greater diameter than a second inlet bore 137). Moreover, the diameter of each exhaust bore may be greater than the diameter of each inlet bore. However, in some embodiments, the average diameter of the each exhaust bore is greater than the average diameter of each inlet bore.

The exhaust bores 136 may be distributed evenly around the circumferential axis 129 such that an angle between each adjacent exhaust bore is the same around the circumferential axis 129. However, in some embodiments, the exhaust bores 136 have a non-uniform distribution around the circumferential axis 129. Similarly, in some embodiments, the inlet bores 134 may be distribution evenly around the axis of rotation 110 such that an angle between an inlet bore and each adjacent inlet bore is the same around the circumferential axis 129. However, in some embodiments, the inlet bores 134 are have a non-uniform distribution around the circumferential axis 129.

Figure 5:
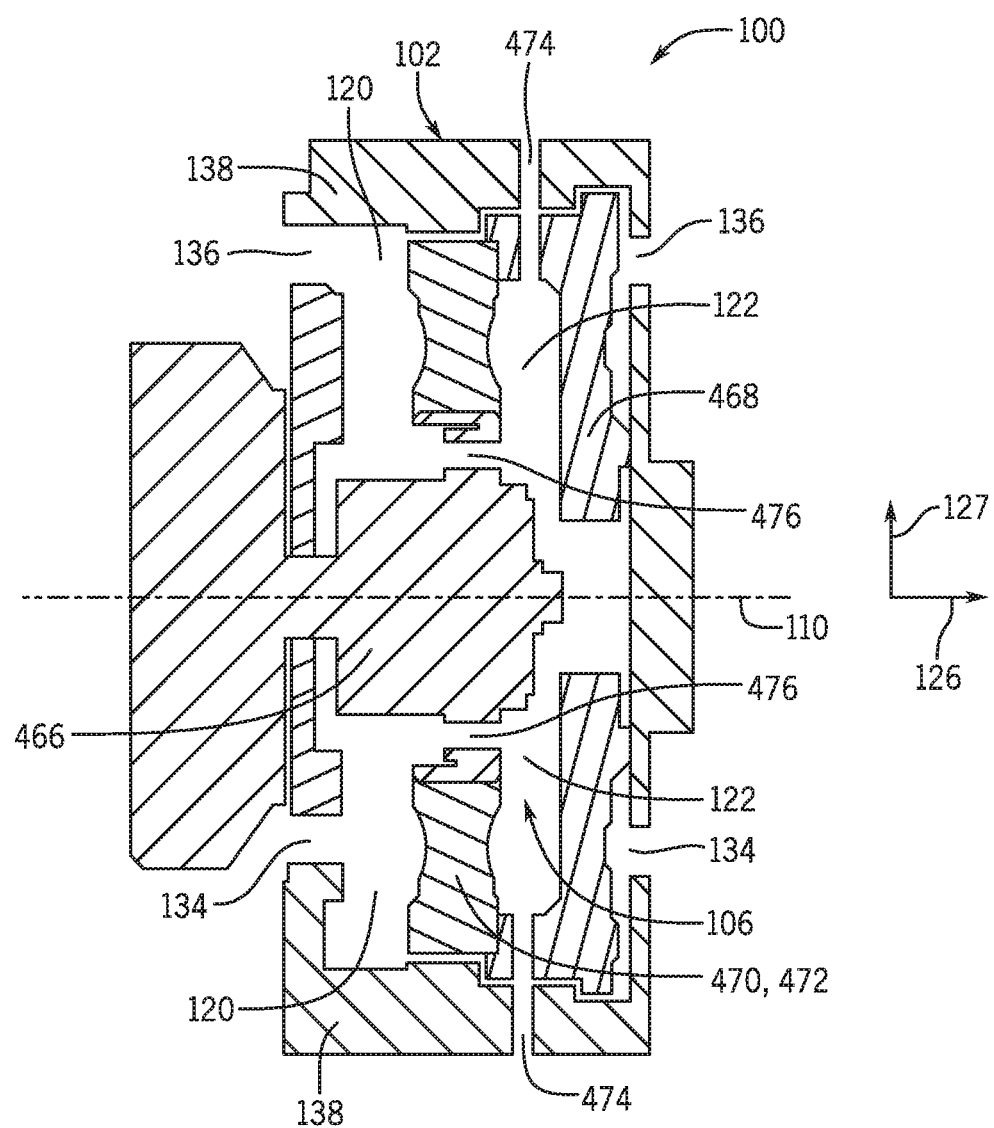
FIG. 5 is a cross-section view of another embodiment of the self-cooling system having additional exhaust bores.

FIG. 5 is a cross-section view of another embodiment of the self-cooling system 400 having additional exhaust bores. Moreover, the self-cooling system 400 has a first rotating component 466 coupled to a second rotating component 468 via a coupling 470. The housing 102 is configured to enclose the first rotating component 466, the second rotating component 468, and the coupling 470. The coupling 470 is configured to form an interface between the first and second rotating components 466, 468. For example, the first rotating component 466 may attach to the coupling 470 at a first interface surface, and the second rotating component 468 may attach to the coupling 470 at a second interface surface. In certain embodiments, the coupling 470 may include a fastener assembly configured to secure the first rotating component 466 to the second rotating component 468. For example, the fastener assembly may include bolts configured to fasten the first rotating component 466 to the second rotating component 468.

In some embodiments, the first rotating component 466 is configured to drive rotation of the second rotating component 468. For example, the first rotating component 466 may be an engine component (e.g., flywheel) and the second rotating component 468 may be a transmission component. An engine may drive rotation of the engine component. Due to the coupling 470 between the engine component and the transmission component, rotation of the engine component drives the transmission component to rotate. Rotation of the first and second rotating components 466, 468 may cause heat generation within the housing 102.

The self-cooling system 400 includes at least one heat generating component 472 that generates heat due to rotation of the first rotating component 466 and/or the second rotating component 468. The at least one heat-generating component may be at least a portion of the first rotating component 466, at least a portion of the second rotating component 468, at least a portion of the coupling 470, or a combination thereof. In some embodiments, the heat generating component 472 generates heat from the friction at contact points between components.

In some embodiments, heat generation may result from vibrations caused by rotation of the first and/or second rotating components. The heat generating component 472 (e.g., coupling 470) may be configured to reduce vibration caused by the first and/or second rotating components. The heat generating component 472 (e.g., coupling 470) may be coupled to the first and/or second rotating components 466, 468. In other embodiments, the heat generating component 472 is coupled to the coupling 470. However, the heat generating component 472 may be disposed at any suitable location in the housing 102 for reducing vibration in the self-cooling system 400.

Moreover, the heat generating component 472 (e.g., coupling 470) may be formed from a resilient material (e.g., rubber). The resilient material may be configured to reduce vibrations (e.g., between the first and second rotating components). In some embodiments, the heat generating component 472 may include a combination of resilient and metal parts. The heat generating component 472 may absorb the vibrational energy to reduce vibrations between components, thereby generating heat. Accordingly, the heat generating component 472 may generate heat via vibro-elastic vibration.

The heat generating component 472 may only generate heat during use (e.g., when the first and/or second rotating components 466, 468 are rotating). As discussed above, the self-cooling system 400 operates during rotation of the first and/or second rotating components. Thus, the self-cooling system 400 may only be active during heat generation. Further, the self-cooling system 400 may not activate during non-use of the first and/or second rotating components. The self-cooling system 400 does not include an auxiliary fan or similar device configured to drive fluid flow 248 in the self-cooling system 400.

In some embodiments, the housing 102 includes a radial exhaust bore 474 configured to enable fluid to exit the housing. The radial exhaust bore 474 is disposed in the radial portion 138 of the housing 102. The radial portion 138 of the housing may be a wall of the housing disposed radially outward, along the radial axis 127, from the longitudinal axis 126. In some embodiments, housing 102 includes multiple exhaust bores (e.g., 1, 2, 3, 4, 5, 6, or more). As discussed above, the first and/or second rotating components 466, 468 may act as a physical and/or thermal barrier between the first chamber 120 of the housing 102 and the second chamber 122 of the housing 102. The radial exhaust bore 474 may pass through the housing 102 into the first and/or second chamber 120, 122 of the housing 102.

In some embodiments, the housing 102 includes multiple radial exhaust bores. The radial exhaust bores may extend into the first and the second chambers 120, 122 of the housing 102. However, in some embodiments, the radial exhaust bores may extend exclusively into either the first chamber 120 of the housing 102 or into the second chamber 122 of the housing 102. Disposing the radial exhaust bores such that the radial exhaust bores extend into the first chamber 120 of the housing 102 may establish more fluid flow through the first chamber 120 of the housing 102 than through the second chamber 122 of the housing 102. Thus, the radial exhaust bores may be positioned to reduce temperatures in a particular chamber (e.g., the first or second chamber 120, 122) of the housing 102.

In some embodiments, the self-cooling system 400 includes at least one transfer bore 476 from the first chamber 120 of the housing 102 to the second chamber 122 of the housing 102. In the illustrated embodiment, the first rotating component 466 includes the at least one transfer bore 476. However, in some embodiments, both the first rotating component 466 and the second rotating component 468 may include at least one transfer bore 476 that pass through the first rotating component 466 and the second rotating component 468 to create a fluid passage from the first chamber 120 of the housing 102 to the second chamber 122 of the housing 102.

The at least one transfer bore 476 may be configured to facilitate air flow from one chamber to the other chamber in the housing 102. For example, the heat generating component 472 may be disposed in the first chamber 120 of the housing 102. Thus, the temperature in the first chamber 120 of the housing 102 may be greater than the temperature in the second chamber 122 of the housing 102. The at least one transfer bore 476 places the first chamber 120 of the housing 102 in fluid communication with the second chamber 122 of the housing 102. As the temperature of the fluid is higher in the first chamber 120 of the housing 102, fluid may flow through the at least one transfer bore 476 from the first chamber 120 to the second chamber 122 of the housing 102. Thus, the at least one transfer bore 476 may act to normalize fluid temperatures between the first chamber 120 of the housing 102 and the second chamber 122 of the housing 102.

In some embodiments, the self-cooling system 400 includes at least one inlet bore 134 extending into the first chamber 120 and at least one inlet bore 134 extending into the second chamber 122. Further, the self-cooling system 400 may include at least one exhaust bore 136 extending into the first chamber 120 and at least one exhaust bore 136 extending into the second chamber 122. This configuration may generate fluid flow through both of the first chamber 120 of the housing 102 and the second chamber 122 of the housing 102 to reduce the temperature of the first rotating component 466 and the second rotating component 468 to a temperature below the desired threshold temperature.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A self-cooling system, comprising:
a housing configured to enclose at least one rotating component configured to rotate relative to the housing, wherein the housing comprises:
at least one inlet bore; and
at least one exhaust bore, wherein the at least one exhaust bore is disposed radially outward from a radial position of the at least one inlet bore with respect to an axis of rotation of the at least one rotating component, and wherein the at least one inlet bore and the at least one exhaust bore are positioned to establish a pressure differential to circulate a fluid into the at least one inlet bore, through the housing, and out of the at least one exhaust bore;
wherein the self-cooling system does not comprise a dedicated fan or additional rotating component configured to drive the fluid into the at least one inlet bore, through the housing, and out of the at least one exhaust bore; and
wherein the at least one inlet bore and the at least one exhaust bore are disposed in an axial end of the housing with respect to the axis of rotation, and the at least one inlet bore and the at least one exhaust bore extend from an exterior of the housing to an interior of the housing.

2. The self-cooling system of claim 1, wherein at least one of the at least one inlet bore and the at least one exhaust bore are coaxial with the axis of rotation.

3. The self-cooling system of claim 1, wherein the at least one exhaust bore comprises a plurality of exhaust bores, and the plurality of exhaust bores comprises a radial exhaust bore disposed in a radial portion of the housing.

4. The self-cooling system of claim 1, wherein at least one of the inlet bore and the at least one exhaust bore each have an arcuate profile along a circumferential axis of the self-cooling system.

5. The self-cooling system of claim 4, wherein the arcuate profile of at least one of the at least one inlet bore and the at least one exhaust bore extends 45 degrees to 75 degrees about the axis of rotation.

6. The self-cooling system of claim 1, wherein the at least one exhaust bore comprises a plurality of exhaust bores.

7. The self-cooling system of claim 1, wherein at least one of the at least one inlet bore and the at least one exhaust bore has a circular profile.

8. A self-cooling system, comprising:
a first rotating component coupled to a second rotating component, via a coupling, wherein the first rotating component is configured to drive rotation of the second rotating component; and
a housing configured to enclose the first rotating component, the second rotating component, and the coupling, wherein the first rotating component, the second rotating component, and the coupling are configured to rotate relative to the housing, and the housing comprises:
at least one inlet bore; and
at least one exhaust bore, wherein the at least one exhaust bore is disposed radially outward from a radial position of the at least one inlet bore with respect to an axis of rotation of the first rotating component, and wherein the at least one inlet bore and the at least one exhaust bore are positioned to establish a pressure differential to circulate a fluid into the at least one inlet bore, through the housing, and out of the at least one exhaust bore;
wherein the self-cooling system does not comprise a dedicated fan or additional rotating component configured to drive the fluid into the at least one inlet bore, through the housing, and out of the at least one exhaust bore; and
wherein the at least one inlet bore and the at least one exhaust bore are disposed in an axial end of the housing with respect to the axis of rotation, and the at least one inlet bore and the at least one exhaust bore extend from an exterior of the housing to an interior of the housing.

9. The self-cooling system of claim 8, wherein the first rotating component comprises at least one transfer bore configured to establish a fluid passage from a first chamber of the housing to a second chamber of the housing, wherein the first chamber is disposed between the first rotating component and the interior of the housing, and the second chamber is disposed between the second rotating component and the interior of the housing.

10. The self-cooling system of claim 8, wherein the at least one inlet bore comprises a plurality of inlets bores, the at least one exhaust bore comprises a plurality of exhaust bores, or a combination thereof.

11. The self-cooling system of claim 10, wherein an average inlet bore size of the plurality of inlet bores is smaller than an average exhaust bore size of the plurality of exhaust bores.

12. The self-cooling system of claim 10, wherein the plurality of exhaust bores are positioned radially outward of the plurality of inlet bores.

13. The self-cooling system of claim 8, wherein the first rotating component comprises a flywheel and the second rotating component comprises a transmission coupling.

14. The self-cooling system of claim 13, wherein at least one of the at least one inlet bore and the at least one exhaust bore has a circular profile.

15. A self-cooling system, comprising:
at least one rotating component;
a housing enclosing the at least one rotating component, wherein the at least one rotating component is configured to rotate relative to the housing, and the housing comprises:
at least one inlet bore; and
at least one exhaust bore, wherein the at least one exhaust bore is disposed radially outward from a radial position of the at least one inlet bore with respect to an axis of rotation of the at least one rotating component, and wherein the at least one inlet bore and the at least one exhaust bore are positioned to establish a pressure differential to circulate a fluid into the at least one inlet bore, through the housing, and out of the at least one exhaust bore;
wherein the self-cooling system does not comprise a dedicated fan or additional rotating component configured to drive the fluid into the at least one inlet bore, through the housing, and out of the at least one exhaust bore; and
wherein the at least one inlet bore and the at least one exhaust bore are disposed in an axial end of the housing with respect to the axis of rotation, and the at least one inlet bore and the at least one exhaust bore extend from an exterior of the housing to an interior of the housing.

16. The self-cooling system of claim 15, comprising at least one heat generating component enclosed within the housing and configured to generate heat via vibro-elastic vibration.

17. The self-cooling system of claim 15, comprising at least one heat generating component enclosed within the housing and formed from a resilient material.

18. The self-cooling system of claim 15, comprising at least one heat generating component enclosed within the housing and coupled to the at least one rotating component.

19. The self-cooling system of claim 15, comprising at least one heat generating component enclosed within the housing, wherein the at least one rotating component comprises a first rotating component and a second rotating component, and the at least one heat generating component is disposed between the first rotating component and the second rotating component.

\* \* \* \* \*